June 30, 1959  J. B. RESWICK ET AL  2,892,660
INERTIA BRAKE CONTROL SYSTEM
Filed June 17, 1957
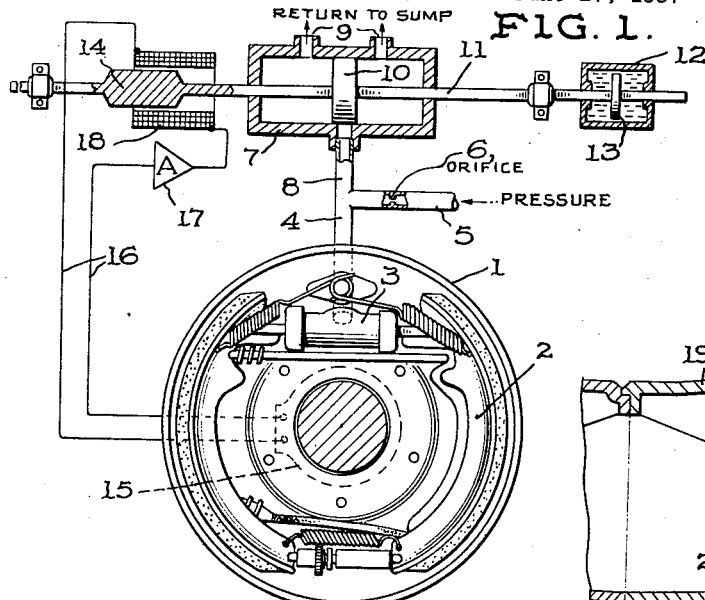
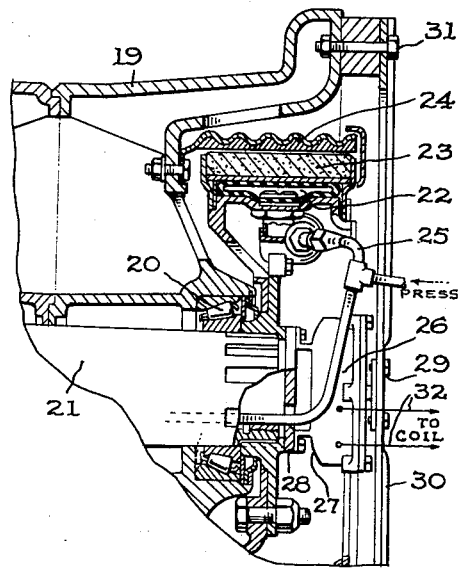
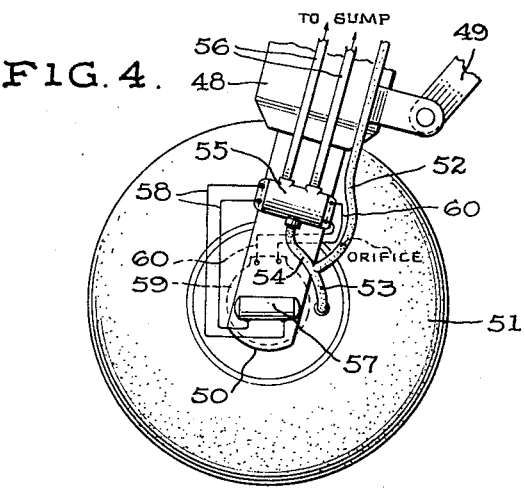
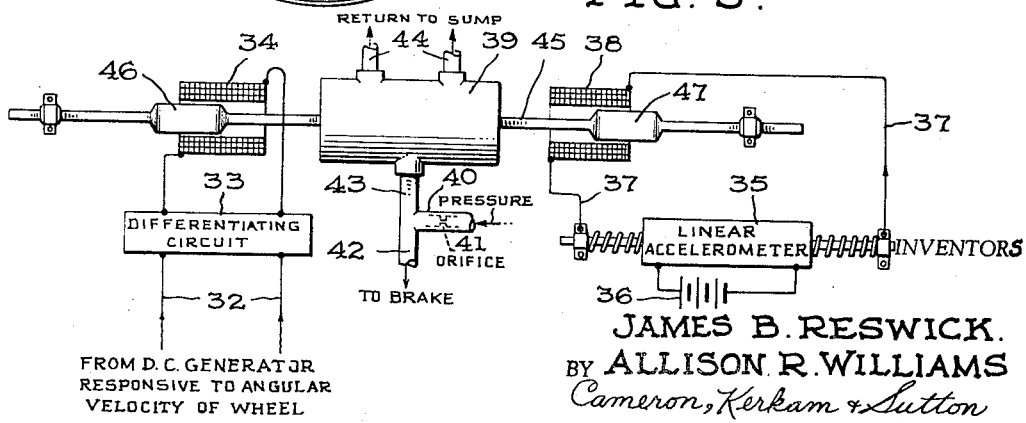
JAMES B. RESWICK.
BY ALLISON R. WILLIAMS
Cameron, Kerkam & Sutton
ATTORNEYS United States Patent Office 2,892,660
Patented June 30, 1959

2,892,660

INERTIA BRAKE CONTROL SYSTEM

James B. Reswick, Newton, Mass., and Allison R. Williams, Vicksburg, Miss.; said Reswick assignor to said Williams Application June 17, 1957, Serial No. 665,927

5 Claims. (Cl. 303—21)

This invention relates to improved means for controlling the acceleration or deceleration of a rotating body in response to an absolute value comparison of the actual angular acceleration or deceleration of the body with a standard of reference acceleration or deceleration that it is deired to provide.

More particularly, the invention relates to improvements in brake control means such as disclosed and claimed in prior Patent No. 2,529,985, granted November 14, 1950, and will be illustrated by reference to a brake control system for the landing wheels of aircraft, but it will be understood that the present invention is in no way restricted to this embodiment.

In the case of any such moving vehicle, application of the brakes results in a deceleration of the forward movement of the vehicle, which will be referred to hereinafter as linear deceleration. When the vehicle body and its wheels are so connected that no relative linear movement takes place between them, the wheels will of course have the same linear deceleration as the vehicle body. In some cases, however, the wheel may have linear movement relative to the body due for example to rearward deflection of the struts on landing or yielding of the resilient suspension, and under such circumstances the actual linear deceleration of the wheel differs from that of the vehicle body. Hence the linear deceleration of the wheel itself will be referred to hereinafter as the standard of reference for the comparison referred to above.

Assuming that the vehicle wheel maintains the ideal conditions of complete rolling contact with the supporting surface without slippage, the linear deceleration and loss of linear velocity of the wheel must be accompanied by corresponding and directly proportional angular deceleration and loss of angular velocity of the wheel. Thus it will be seen that an absolute value corresponding to the linear deceleration or the resultant decrease in forward velocity of the wheel provides an accurate standard of reference against which a second absolute value corresponding to the actual angular deceleration or loss of angular velocity of the wheel can be compared to determine how closely its actual performance approaches the ideal.

Differences that appear in the comparisons of such absolute values can also be utilized through suitable mechanical and/or electrical means to control the brakes on the wheel or wheels in question so as to minimize departures of performance from the desired conditions of operation. In some instances velocities rather than decelerations may be compared as described in my prior application Serial No. 551,675, filed December 7, 1955. Comparison of decelerations, i.e., rates of change of velocity, is utilized in the brake control systems described hereinafter, as it may afford a more sensitive and quicker control in view of the fact that an appreciable period of time may be required for the actual velocity of a decelerating wheel to change materially, whereas the rate of change of velocity may be very high at the instant deceleration begins. In any event the direct measurement of linear deceleration of the wheel is always the origin of the standard of reference.

The absolute value to be used as the standard of reference can be determined most readily by the use of a seismic mass on the wheel so that as soon as deceleration begins, the mass tends to move forward relative to the wheel with a force equal to the product of mass and deceleration and therefore proportional to deceleration. This mechanical force may be the absolute value utilized in the comparison described above, or the seismic mass may be embodied in various well known types of linear decelerometers which develop electromotive forces proportional to the aforesaid mechanical force. Three types of such devices are mentioned in my prior patent, and still others are disclosed in patents Nos. 2,494,109 and 2,552,722.

The absolute value corresponding to the actual angular deceleration of the wheel to be controlled can be provided by the use of any suitable type of angular decelerometer which develops a mechanical or an electromotive force proportion to angular deceleration. Several types of electric angular decelerometers are disclosed or referred to in my aforesaid prior patent, and a suitable mechanical angular decelerometer is described hereinafter. Strain gauge as well as differential transformer type angular decelerometers are also known and can be used if desired; see for example Patents Nos. 2,453,548 and 2,638,335. Other types are disclosed in Patents Nos. 1,096,942 and 2,505,636. Still other angular decelerometers employ two elements rotating at the same speed, one of which is capable of angular displacement relative to the other which is resisted by a spring.

It may be preferred, however, to utilize a conventional generator driven by the wheel and developing an electromotive force proportional to the speed of rotation, and then to differentiate the electromotive force to obtain a signal proportional to deceleration. As is well known, basic differentiating networks utilize series capacitance or shunt inductance, and there are also various known electronic differentiating circuits such as that disclosed in Patent No. 2,702,855.

The present invention provides novel means for effecting an absolute value comparison as described above by the use of simple equipment with consequent relatively low initial cost and upkeep, with particular reference to the control of pressure-operated brakes on airplanes or other automotive vehicles. In the case of airplanes for example, the landing roll has lengthened to the point where maximum braking is needed, yet the skid problem has become greater at the same time. In landing, wheel load conditions vary from little or no contact to full aircraft weight and the correct brake pressure varies over a correspondingly wide range. The problem is further complicated by wheel bounce, crosswind landings where one or more wheels may be off the ground for considerable distances, wet or icy runways, etc. Even under normal or ideal conditions, much less under such widely varying conditions, the wheels themselves cannot be relied upon as a reference for adequate control of the braking effect thereon for slip control, because of the basic fallacy that the braking torque to be controlled is an extraneous force affecting the controlling means.

In the operation of systems as described above and in my prior application under such conditions, the valve normally operates to relieve the brake pressure only when the angular deceleration of the wheel is greater than the linear deceleration. Abnormal conditions may occur, however, in which the force responsive to linear deceleration is greater than that responsive to changes in angular velocity, but still it may be desirable to relieve the brake pressure. Safety precautions of this nature may be inherent in the method of comparison employed, but can readily be provided by the use of a valve which relieves the brake pressure in any case where either of the forces being compared exceeds the other by some predetermined amount, the brake being operative only as long as any difference between these forces remains within a predetermined range. The present invention relates particularly to control systems embodying the last named safety precautions.

The systems described generally above are illustrated by the examples shown somewhat diagrammatically in the accompanying drawings, in which—

Fig. 1 shows an improved system of the type having a seismic mass carried by the valve stem;

Fig. 2 shows details of a suitable wheel braking mechanism;

Fig. 3 shows a system in which the valve is energized by electromotive forces proportional to linear and angular deceleration respectively; and Fig. 4 shows the preferred location of the linear decelerometer and other parts with respect to an airplane wheel.

Fig. 1 shows by way of example a conventional brake drum 1 of a vehicle wheel which for present purposes may be assumed to be that of an airplane, although as noted above the invention is not limited to this application. As shown, the wheel brake comprises internal expanding brake shoes 2 operated by a hydraulic brake cylinder 3, a hydraulic pressure fluid being supplied to the cylinder 3 through a pressure supply line 4. All of these parts may be of any suitable known type, and inasmuch as their operation is well understood in the art it need not be described in detail herein. The supply of pressure fluid comes through a line 5 containing a restricted orifice 6 through which the pressure fluid passes to the line 4 and cylinder 3.

A control valve 7 is installed in a by-pass 8 of the pressure line 4. This valve may be of any suitable known type which normally closes the bypass line 8 but, when moved in either direction, permits the hydraulic fluid in the supply line to flow through the orifice and the bypass line 8 to the valve 7 and thence through either of two outlets 9 back to the sump, thus relieving the pressure on the brakes. For convenience, Fig. 1 shows a simple piston valve having a slidable piston 10 normally occupying the position shown in Fig. 1, motion of the piston in either direction resulting in connecting the bypass line 8 with one of the outlets 9. In the normal position shown, pressure fluid from the line 5 passes to the brake cylinder 3 through the orifice 6 and the line 4. The width of the piston 10 is sufficient to lap the edges of the opening of the bypass line 8 by a small amount when the piston 10 is in its normal position.

The control valve is operated by the differential force obtained by comparison of a mechanical force proportional to linear deceleration and an electromotive force proportional to actual angular deceleration. This differential force may be used to move the valve piston by any suitable mechanical means which in the form shown comprise merely a valve stem 11 connected to the movable piston and extending slidably out the end of the valve body. Preferably the valve stem extends out at both ends of the valve body, and the motion of the valve may also be damped if desired by any suitable means such as a dashpot 12 and a piston 13 on the valve stem.

The mechanical force proportional to linear deceleration is produced by a seismic mass 14 which for simplicity has been shown as formed on the valve stem itself, although as previously stated it may be a separate mass mechanically connected to the valve stem. Assuming the airplane or other vehicle to be moving to the left, then whenever deceleration begins the mass 14 tends to move the valve plug 10 to the left.

The electromotive force proportional to actual angular deceleration may be developed by an angular decelerometer of any of the types mentioned above, as indicated diagrammatically at 15. It may be preferred, however, to employ a conventional electric generator together with a differentiating circuit as described hereinafter in connection with Fig. 3. The electromotive force generated by the decelerometer 15 is supplied through leads 16 and amplifier 17 to an electromagnetic winding 18 arranged to exert an electromagnetic force on the valve stem 11 in a direction opposite to that of the mechanical force exerted by the mass 14. For simplicity, this mass itself has been shown as the armature of the electromagnet 18, but this arrangement is not necessary.

When the linear forward (i.e., leftward) motion of the wheel begins to decelerate, and assuming the ideal condition of true rolling contact with no slippage, the mass 14 tends to move the valve plug to the left with a force proportional to linear deceleration and in turn to normal rotary deceleration. On the other hand, the electromagnet 18 tends to move the valve plug to the right with a force proportional to actual angular deceleration which under ideal conditions is the same as normal rotary deceleration. These opposite forces are thus compared and can be arranged to balance out with no differential in either direction as long as ideal conditions exist.

If slipping begins, however, the rotation of the wheel is slowed rapidly by the brake and the actual angular deceleration increases rapidly. As explained in the aforesaid patent, this can take place very quickly, and is accompanied by an immediate increase in the current through the electromagnet 18 so that a differential force is created which moves the valve plug to the right with the result that the pressure on the wheel brake is relieved. Should the wheel nevertheless lock for any reason, the linear deceleration force exceeds the pull of the coil 18, and the valve piston 10 moves to the left beyond normal position to relieve the brake pressure. Within a normal range determined by the lap of the piston valve 10 relative to the bypass port 8, the brake pressure is fully operative, but beyond this range in either direction the pressure on the brake is relieved.

Fig. 2 illustrates a suitable mounting of a decelerometer such as 15 (or generator as in Fig. 3) on a conventional type of airplane wheel having a rim 19 for the usual tire and turning on roller bearings 20 on an axle 21. The hydraulic fluid in a radially expansible annular chamber 22 forces the brake shoe or shoes 23 outwardly into engagement with a brake drum 24 when pressure is supplied through the line 25 corresponding to the line 4 in Fig. 1. The decelerometer casing 26 may be mounted coaxially with the wheel axle 21 by suitable means such as brackets 27 secured to the end plate 28 of the axle. The rotative parts of the decelerometer may suitably be rotated by coupling bolts 29 which are secured to a spider 30 having its arms bolted at 31 to the wheel rim 19. The output leads 32 correspond to the leads 16 of Fig. 1.

In the embodiment shown in Fig. 3, a D.C. generator of any suitable type which rotates with the wheel as described above develops an electromotive force proportional to the actual angular velocity of the wheel. The generator output passes through the leads 32 to a differentiating circuit 33 of any suitable type mentioned above and thence to a solenoid coil 34.

A second electromotive force proportional to linear deceleration and hence to normal angular deceleration is developed by a suitable linear accelerometer or decelerometer 35 of one of the types mentioned above which is energized by any desired source 36. This decelerometer may be of the type illustrated in my aforesaid prior patent, for example. The output of the decelerometer is passed through the output leads 37 to an electromagnetic solenoid coil 38.

The brake pressure is controlled by a valve 39 similar to the valve 7 of Fig. 1. The fluid pressure line 40 and orifice 41 are connected to the brake pressure line 42 and bypass line 43, the latter leading to the valve 39 which is provided with two outlets 44 connected to the sump. The valve stem 45 extends out both ends of the valve body and carries two armatures or solenoid cores, one core 46 cooperating with the coil 34 and the other core 47 with the coil 38. It will be seen that the valve will move in either direction depending upon which coil predominates. As described in connection with Fig. 1, there may be a small range of such movement that has no effect due to the provision of valve lap, but movement beyond this range in either direction results in relieving the brake pressure.

Fig. 4 illustrates by way of example a suitable arrangement for mounting apparatus embodying the invention on airplanes. As shown, 48, 49 and 50 exemplify parts of a conventional mounting for a landing wheel 51. The wheel brake is controlled by fluid pressure in the lines 52, 53, the line 52 containing an orifice such as the orifice of Fig. 1. The bypass line 54 leads to the control valve unit 55 from which outlets 56 return to the sump.

The unit 55 may be of the type illustrated in Fig. 3, including in one unit not only the valve itself but also the two solenoids. A linear decelerometer 57 corresponding to the decelerometer 35 in Fig. 3 is connected to one end (or solenoid coil) of the unit 55 by leads 58. Preferably this decelerometer is mounted on the strut 50 in the horizontal plane of the wheel axis. An angular decelerometer is indicated diagrammatically at 59, its output being connected to the other end (or solenoid coil) of the unit 55 by leads 60.

It will be understood that the term "acceleration" includes both positive and negative accelerations and that the term "deceleration" is equivalent to a negative acceleration. The terms "accelerometer" and "decelerometer" thus include devices responding to either positive or negative accelerations.

While the embodiments of the invention illustrated on the accompanying drawings have been described with considerable particularity, it will be understood that the invention is not limited to these embodiments but is susceptible of a variety of expressions or forms which will suggest themselves to those skilled in the art. Further while the invention has been particularly illustrated and described with reference to the control of brakes on airplane landing wheels, it is not limited to this use but is equally applicable to other wheeled vehicles such as trucks, railway cars, automobiles, etc. Still further, while certain devices have been described in detail, particularly various types of linear and angular decelerometers, it is to be understood that any other known devices of these types can be employed, and that the elements illustrated may be replaced by equivalent elements and various other changes may be made in the details of construction and arrangement of the parts, without departing from the spirit of the invention.

For defining the present invention reference is therefore to be had to the appended claims wherein the deceleration corresponding to true rolling, with no slippage, will be identified as the linear or normal angular deceleration, for comparison with the actual angular deceleration of the wheel at any instant, the two being the same when slippage is absent, but immediately providing a differential as soon as slippage starts, release of the brake being made to depend only on the existence of such a differential from whatever cause or causes, followed by reapplication of the brake upon disappearance of said differential. It is also to be understood that said differential may be considered zero as a practical matter, although not mathematically so, until a resultant differential of sufficient magnitude in the sources of energy is generated to control the pressure of fluid in the brake cylinder for determining the application or release of the brake.

What is claimed is:

1. In a braking system for a wheeled vehicle having a pressure-operated wheel brake, the combination of a normally closed bypass valve connected to the pressure line to the brake and openable to relieve the brake pressure, linear decelerometer means responsive to changes in linear velocity of the wheel for generating a force proportional to its linear deceleration, angular decelerometer means responsive to changes in the angular velocity of the wheel for generating a force proportional to its angular deceleration, and valve actuating means connecting each of said decelerometer means with said valve whereby said forces tend to move said valve in opposite directions, said valve having a valve member which in its normal position closes said connection to the pressure line but which on movement in either direction establishes communication from said pressure line to the valve body, said valve also having pressure relief passages communicating with said valve body to bypass said brake pressure line on movement of the valve in either direction from its normal position.

2. A braking system as defined in claim 1, said brake pressure line having a restricted orifice therein on the pressure side of said bypass connection.

3. A braking system as defined in claim 1, said linear decelerometer means comprising a seismic mass movable in a fore and aft direction in response to changes in linear velocity of the wheel.

4. A braking system as defined in claim 3, said seismic mass being connected with the stem of said valve, said angular decelerometer means generating an electromotive force proportional to said angular deceleration, said valve-actuating means including a solenoid energized by said electromotive force and having an armature connected to the valve stem.

5. A braking system as defined in claim 1, said decelerometer means each generating an electromotive force proportional to deceleration, two solenoid coils each energized by one of said decelerometer means, and armatures for said solenoids and connected with the stem of said valve to move the valve in opposite directions.

References Cited in the file of this patent

UNITED STATES PATENTS

| | | |
|---|---|---|
| 2,038,145 | Cook et al. | Apr. 21, 1936 |
| 2,181,161 | Wolf | Nov. 28, 1939 |
| 2,424,288 | Severy | July 22, 1947 |
| 2,451,263 | Webb | Oct. 12, 1948 |
| 2,529,985 | Williams | Nov. 14, 1950 |

FOREIGN PATENTS

| | | |
|---|---|---|
| 634,847 | Great Britain | Mar. 29, 1950 |